United States Patent [19]

Okinaka et al.

[11] Patent Number: 5,155,190
[45] Date of Patent: Oct. 13, 1992

[54] PROCESS FOR PRODUCING POLY METHYL METHACRYLATE/N-SUBSTITUTED MALEIMIDE OPTICAL RESIN

[75] Inventors: Takaaki Okinaka; Kiyomi Sugawara, both of Ichihara, Japan; Hiromasa Kawai, Midland, Mich.; Fumiaki Kanega, Ichihara, Japan

[73] Assignee: Hitachi Chemical Company, Tokyo, Japan

[21] Appl. No.: 707,280

[22] Filed: May 28, 1991

Related U.S. Application Data

[63] Continuation of Ser. No. 403,387, Sep. 6, 1989, abandoned.

[30] Foreign Application Priority Data

Sep. 6, 1988 [JP] Japan .................................. 63-222696

[51] Int. Cl.⁵ ........................................... C08F 220/52
[52] U.S. Cl. ................................... 526/203; 526/262; 528/322
[58] Field of Search ................... 526/262, 203; 528/322

[56] References Cited

U.S. PATENT DOCUMENTS

| | | | |
|---|---|---|---|
| 3,676,404 | 7/1972 | Nield | 526/262 |
| 4,696,978 | 9/1987 | Dean | 525/205 |
| 4,868,261 | 9/1989 | Kobayashi et al. | 526/262 |

Primary Examiner—Harold D. Anderson
Attorney, Agent, or Firm—Antonelli, Terry, Stout & Kraus

[57] ABSTRACT

An optical resin obtained by polymerizing 97 to 50% by weight of methyl methacrylate, 3 to 30% by weight of an N-substituted maleimide, and 0 to 40% by weight of an unsaturated monomer by suspension polymerization at a pH of 5.5 to 7.5 is excellent in heat resistance and transparency.

4 Claims, No Drawings

PROCESS FOR PRODUCING POLY METHYL METHACRYLATE/N-SUBSTITUTED MALEIMIDE OPTICAL RESIN

This application is a continuation of application Ser. No. 403,387 filed Sep. 6, 1989, now abandoned.

BACKGROUND OF THE INVENTION

This invention relates to an optical resin, a process for producing the same, and a molded article obtained therefrom.

Methacrylic resins including methyl methacrylate as a major component are in general excellent in transparency and weather resistance, and thus are widely used in various fields such as automobile parts, electric parts, optical elements, etc. But these methacrylic resins have a heat deformation temperature of about 100° C. at highest, and are not always sufficient in heat resistance. Therefore, improvement in heat resistance has strongly been desired.

In order to improve the heat resistance of methacrylic resins, there have been proposed a process for copolymerizing methyl methacrylate with α-methylstyrene and maleic anhydride (Japanese Patent Examined Publication No. 49-10156), a process for copolymerizing methyl methacrylate with a polyfunctional monomer, followed by crosslinking (Japanese Patent Unexamined Publication No. 63-30510), and a process for producing a methacrylimide-containing polymer by reacting a methacrylic resin with a primary amine (Japanese Patent Unexamined Publication No. 61-64703). According to these proposals, the heat resistance is improved to some extent, but there are problems in that the productivity is low and complicated due to extremely slow polymerization rate and the use of special reaction apparatus, and properties are not good due to production of remarkably colored molded articles and poor processability. Further, it is also proposed to copolymerize methyl methacrylate with N-arylmaleimide (Japanese Patent Examined Publication No. 43-9753), but the heat resistance is not improved effectively and the productivity is still insufficient.

On the other hand, copolymers of methyl methacrylate and an N-substituted maleimide can be produced by bulk polymerization, solution polymerization, emulsion polymerization, suspension polymerization, and the like. Among these polymerization methods, the bulk polymerization method has problems in that a reaction apparatus is expensive and control of the reaction is difficult. The solution polymerization method has a defect in that productivity is low. The emulsion polymerization method and the suspension polymerization method have advantages over the bulk polymerization method and the solution polymerization method in that the reaction apparatus is not expensive, control of the reaction is easy and productivity is high. But, according to the emulsion polymerization method, there are some problems in that an emulsifying agent is mixed into a final product due to the use of a large amount of it, resulting in generation of opaqueness and making the transparency remarkably poor. Therefore, the emulsion polymerization method is not suitable for producing an optical resin.

Further, according to a known suspension polymerization, the resulting copolymer of methyl methacrylate and N-substituted maleimide is undesirably poor in transparency which is a feature of methacrylic resin containing no N-substituted maleimide. This is caused by a remarkably large amount of unreacted N-substituted maleimide (residual monomer) and hydrolyzed products of N-substituted maleimide.

SUMMARY OF THE INVENTION

It is an object of the present invention to provide an optical resin excellent in transparency by reducing the residual amount of unreacted N-substituted maleimide and hydrolyzed products of N-substituted maleimide. It is another object of the present invention to provide a process for producing such an optical resin.

The present invention provides an optical resin comprising (A) 97 to 50% by weight of a methyl methacrylate unit of the formula:

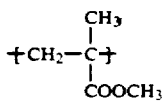

(B) 3 to 30% by weight of an N-substituted maleimide unit of the formula:

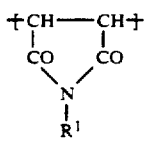

wherein $R^1$ is a monovalent organic group; and (C) 0 to 40% by weight of a unit of an unsaturated monomer other than methyl methacrylate and the N-substituted maleimide, and copolymerizable therewith, and represented by the formula:

wherein $R^2$ is a divalent organic group, said resin having light beam transmittance of 90% or higher.

The present invention also provides a process for producing such an optical resin which comprises
subjecting a monomer mixture comprising (a) 97 to 50% by weight of methyl methacrylate, (b) 3 to 30% by weight of an N-substituted maleimide, and (c) 0 to 40% by weight of an unsaturated monomer other than methyl methacrylate and the N-substituted maleimide and copolymerizable therewith, a total weight of monomers being 100% by weight, to suspension polymerization at a pH of 5.5 to 7.5.

The present invention further provides a molded article obtained from said optical resin.

DESCRIPTION OF THE PREFERRED EMBODIMENTS

The optical resin of the present invention comprises
(A) 97 to 50% by weight of a methyl methacrylate unit of the formula:

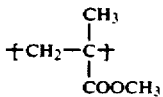

(B) 3 to 30% by weight of an N-substituted maleimide unit of the formula:

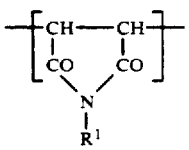

wherein $R^1$ is a monovalent organic group such as an alkyl group preferably having 1 to 6 carbon atoms, e.g. a methyl group, an ethyl group, a n-propyl group, an i-propyl group, a n-butyl group, a t-butyl group, a cyclohexyl group, etc.; a phenyl group substituted with an alkyl group, a halogen atom, an alkoxy group, a carboxylic group, etc., e.g., a methylphenyl group, a chlorophenyl group, a methoxyphenyl group, a carboxyphenyl group, a benzyl group, and (C) 0 to 40% by weight of a unit of an unsaturated monomer other than methyl methacrylate and the N-substituted maleimide and copolymerizable therewith, and represented by the formula:

wherein $R^2$ is a divalent organic group such as a group derived from an alkyl ester of acrylic acid, e.g. methyl acrylate, ethyl acrylate, butyl acrylate, etc.; a group derived from an aromatic ester of acrylic acid, e.g. phenyl acrylate, benzyl acrylate, etc.; a group derived from a substituted aromatic ester of acrylic acid, e.g. chlorophenyl acrylate, bromophenyl acrylate, etc.; a group derived from a halogenated alkyl ester of acrylic acid, e.g. fluoromethyl acrylate, chloroethyl acrylate, bromomethyl acrylate, etc.; a group derived from an alkyl ester of methacrylic acid, e.g. ethyl methacrylate, butyl methacrylate, 2-ethylhexyl methacrylate, etc.; a group derived from an aromatic ester of methacrylic acid, e.g. phenyl methacrylate, benzyl methacrylate, etc.; a group derived from a substituted aromatic ester of methacrylic acid, e.g. chlorophenyl methacrylate, bromophenyl methacrylate, etc.; a group derived from a cycloalkyl ester of methacrylic or acrylic acid, wherein the cycloalkyl moiety preferably has 7 to 12 carbon atoms, e.g. cyclopentyl acrylate, cyclopentyl methacrylate, cyclohexyl acrylate, cyclohexyl methacrylate, norbornyl acrylate, norbornyl methacrylate, isobornyl acrylate, isobornyl methacrylate, menthyl acrylate, methyl methacrylate, phentyl acrylate, phentyl methacrylate, adamantyl acrylate, adamantyl methacrylate, tricyclo-[5,2,1,0$^{2,6}$]deca-8-yl tricyclo [5,2,1,0$^{2,6}$]deca-8-yl methacrylate, cyclodecyl acrylate, cyclodecyl methacrylate, cyclododecyl methacrylate, etc.; a group derived from an aromtic vinyl compound, e.g. styrene, α-methylstyrene, chlorostyrene, methylstyrene, etc.; a group derived from a cyanated vinyl compound, e.g. acrylonitrile, methacrylonitrile, etc.

In order to obtain the optical resin excellent in mechanical properties, moldability and weather resistance, it is necessary to use methyl methacrylate in an amount of 50 to 97% by weight, preferably 70 to 95% by weight.

In order to obtain the optical resin excellent in heat resistance and transparency, it is necessary to use the N-substituted maleimide in an amount of 3 to 30% by weight, preferably 5 to 20% by weight. When the amount of N-substituted maleimide is less than 3% by weight, the heat resistance is not improved. On the other hand, when the amount is more than 30% by weight, unreacted N-substituted maleimide is readily retained in an amount of 1.0% by weight or more (a total of the polymer and the unreacted N-substituted maleimide being 100% by weight), which results in lowering mechanical properties of the resin and lowering the light beam transmittance due to coloring of the resulting resin. Therefore, it is preferable to make the amount of unreacted N-substituted maleimide 1.0% by weight or less (a total weight of the polymer and the unreacted N-substituted maleimide being 100% by weight).

Examples of the N-substituted maleimide are N-alkyl substituted maleimides such as N-methylmaleimide, N-ethylmaleimide, N-n-propylmaleimide, N-i-propylmaleimide, N-n-butylmaleimide, N-t-butylmaleimide, N-cyclohexylmaleimide, etc.; N-aryl substituted maleimides such as N-methylphenylmaleimide, chlorophenylmaleimide, N-carboxyphenylmaleimide, N-benzylmaleimide, etc.

From the viewpoint of not damaging transparency, the use of maleimides not colored by itself such as N-t-butylamleimide, N-cyclohexylmaleimide and N-chlorophenylmaleimide is preferable.

As the unsaturated monomer other than methyl methacrylate and the N-substituted maleimide and copolymerizable therewith, there can be used one or more unsaturated fatty acid esters, aromatic vinyl compounds, cyanated vinyl compounds, unsaturated fatty acids and derivatives thereof, etc., in an amount of up to 40% by weight, unless the object of the present invention is not damaged.

Examples of the unsaturated fatty acid esters are alkyl esters of acrylic acid such as methyl acrylate, ethyl acrylate, butyl acrylate, 2-ethylhexyl acrylate, etc.; aromatic esters of acrylic acid such as phenyl acrylate, benzyl acrylate, naphthyl acrylate, etc.; substituted aromatic esters of acrylic acid such as fluorophenyl acrylate, chlorophenyl acrylate, bromophenyl acrylate, fluorobenzyl acrylate, chlorobenzyl acrylate, bromobenzyl acrylate, etc.; halogenated alkyl esters of acrylic acid such as fluoromethyl acrylate, fluoroethyl acrylate, chloroethyl acrylate, bromoethyl acrylate, etc.; acrylic acid esters such as hydroxyalkyl acrylates, glycidyl acrylate, ethylene glycol acrylate, polyethylene glycol acrylates, alkylaminoalkyl acrylates, cyanoalkyl acrylates, etc.; alkyl esters of methacrylic acid such as ethyl methacrylate, butyl methacrylate, 2-ethylhexyl methacrylate, etc.; aromatic esters of methacrylic acid such as phenyl methacrylate, benzyl methacrylate, naphthyl methacrylate, etc.; substituted aromatic esters of methacrylic acid such as fluorophenyl methacrylate, chlorophenyl methacrylate, bromophenyl methacrylate, fluorobenzyl methacrylate, chlorobenzyl methacrylate, bromobenzyl methacrylate, etc.; halogenated alkyl esters of methacrylic acid such as fluoromethyl methacrylate, fluoroethyl methacrylate, chloroethyl methacrylate, bromoethyl methacrylate, etc.; methacrylic acid esters such as hydroxyalkyl methacrylates, glycidyl methacrylate, ethylene gylcol methacrylate, polyethylene glycol methacrylates, alkylaminoalkyl methacrylate, cyanoalkyl methacrylates, etc.; α-substituted acrylic acid esters such as α-fluoroacrylic acid ester, α-chloroacrylic acid ester, α-cyanoacrylic ester, etc.; methacrylic acid cyclic alkyl esters such as cyclopentyl methacrylate, cyclohexyl methacrylate, methylcyclohexyl methacrylate, trimethylcyclohexyl methacrylate, norbornyl methacrylate, norbornylmethyl methacrylate, isobornyl methacrylate, bornyl methacrylate, menthyl methacrylate, phentyl methacrylate, adamantyl methacrylate, dimethyladamantyl methacrylate, tricyclo[5,2,1,0$^{2,6}$]deca-8-yl methacrylate, tricyclodecyl methacrylate, tricyclo-[5,2,1,0$^{2,6}$]deca-4-methyl methacrylate, cyclodecyl methacrylate, etc., and acrylic acid esters having the same ester portions as mentioned above.

Examples of the aromatic vinyl compounds are styrene; α-substituted styrenes such as α-methylstyrene, α-ethylstyrene, α-fluorostyrene, α-chlorostyrene, etc.; nucleus-substituted styrenes such as fluorostyrene, chlorostyrene, bromostyrene, methylstyrene, butylstyrene, methoxystyrene, etc.

Examples of the cyanated vinyl compounds are acrylonitrile, methacrylonitrile, etc.

Examples of unsaturated fatty acids and derivatives thereof are (meth)acrylamides such as acrylamide, methacrylamide, N-dimethylacrylamide, N-diethylacrylamide, N-dimethylmethacrylamide, N-diethylmethacrylacrylamide, etc.; metal salts of acrylic acid or methacrylic acid such as calcium acrylate, calcium methacrylate, barium acrylate, barium methacrylate, lead acrylate, lead methacrylate, tin acrylate, tin methacrylate, zinc acrylate, zinc methacrylate, etc.; and acrylic acid and methacrylic acid.

The optical resin of the present invention is produced by suspension polymerization at a pH of 5.5 to 7.5 using a polymerization initiator or catalyst.

As the polymerization initiator or catalyst, there can be used conventional polymerization initiators for radical polymerization such as organic peroxides, azo compounds, water-soluble catalysts, redox catalysts, etc.

Examples of the organic peroxides are benzoyl peroxide, lauroyl peroxide, di-t-butylperoxy hexahydroterephthalate, t-butylperoxy-2-ethylhexylhexanoate, 1,1-di-t-butylperoxy-3,3,5-trimethylcyclohexane, etc.

Examples of the azo compounds are azobisisobutyronitrile, azobis-4-methoxy-2,4-dimethylvaleronitrile, azobiscyclohexanone-1-carbonitrile, azodibenzoyl, etc.

Examples of the water-soluble catalysts are potassium persulfate, ammonium persulfate, etc.

Examples of the redox catalysts are a combination of a peroxide or persulfate and a reducing agent such as a combination of benzyl peroxide and dimethyl aniline, a combination of benzyl peroxide and ferrous ion, etc.

The polymerization initiator or polymerization catalyst can be used in an amount of 0.01 to 10% by weight based on the total weight of the polymer suspension polymerized.

It is possible to use a polymerization regulator such as a mercaptan compound e.g. dodecyl mercaptan, o-octyl mercaptan, etc., thioglycol, carbon tetrabromide, α-methylstyrene dimer, etc., for regulating the molecular weight.

The polymerization is preferably carried out at a temperature of 0° to 200° C., more preferably 50° to 120° C.

The suspension polymerization is carried out in an aqueous medium using a suspending agent. As the suspending agent, there can be used a difficulty soluble inorganic substance such as calcium phosphate, magnesium pyrophosphate, etc.; a water-soluble polymer such as polyvinyl alcohol, methyl cellulose, polyacrylamide, poly(meth)acrylic acid salt, or the like. It is preferable to use the poly(meth)acrylic acid salt from the viewpoint of transparency.

The poly(meth)acrylic acid salt usable as a water-soluble polymer can be produced by polymerizing a hydroxyalkyl (meth)acrylate, a salt (a lithium salt, sodium salt, potassium salt, magnesium salt, calcium salt, ammonium salt, etc.) of (meth)acrylic acid, or (meth)acrylic acid, and, if necessary, one or more other unsatuated monomers copolymerizable therewith.

The suspending agent can be used in the suspension polymerization in an amount of 0.03 to 1% by weight based on the total weight of the monomers to be suspension polymerized.

The suspension polymerization should be carried out at a pH of 5.5 to 7.5, preferably 6.0 to 7.0. The maleimide is readily subjected to formation of maleic acid and hydrolyzed products of primary amine in an acidic side. On the other hand, in an alkaline side, the hydrolysis takes place very rapidly. By the hydrolysis, the suspension polymerization system becomes very unstable. Further, the hydrolyzed products remarkably accelerate coloring cf the resin. When the aqueous solution of suspension polymerization is in the range of pH 5.5 to 7.5, the hydrolysis hardly takes place to make the polymerization system stable without coloring the resin. Further, the resin can be made to have the light beam transmittance of 90% or more.

The pH of the polymerization system can be adjusted by using hydrochloric acid, acetic acid, tartaric acid, sodium hydroxide, potassium hydroxide, a buffering agent such as a combination of disodium hydrogen phosphate-sodium dihydrogen phosphosphate, a combination of potassium dihydrogen phosphate-sodium hydroxide, etc.

The molecular weight of the optical resin is not particularly limited. From the viewpoint of excellent heat resistance and mechanical properties, weight-average molecular weight (converted to standard polystyrene) of 10,000 to 1,000,000 is preferable. When the optical resin is used as a molding material, the weight-average molecular weight in the range of 10,000 to 1,000,000 is particularly preferable.

When the optical resin is practically used, it is possible to add thereto one or more conventionally used antioxidants of phenol series, phosphite series and thioether series compounds; surface active agents of aliphatic alcohols, fatty acid esters, phthalic acid esters, triglycerides, and fluorine-containing compounds; mold release agents such as metal salts of higher fatty acids; lubricating agents; plasticizers; antistatic agents; flame retardants; heavy metal inactivating agents; etc. from the viewpoint of prevention of deterioration, thermal stability, moldability, processability, and the like so long as the transparency is not damaged.

The optical resin of the present invention is molded into an article useful as an optical means, e.g. lenses and optical disc substrates, etc. As a molding method, injection molding can prefrably be employed under conditions of a cylinder temperature of 200° to 300° C.; an injection speed of 10 to 300 cm$^3$/sec; and a mold temperature of 70° to 140° C.

The present invention is illustrated by way of the following Examples, in which all percents are by weight, unless otherwise specified.

REFERENCE EXAMPLE 1

Synthesis of Water-soluble Polymer (A)
(Polymethacrylate Salt) Used as a Suspending Agent In a separable flask having an inner volume of 500 ml, 5 g of methyl methacrylate, 12 g of 2-hydroxyethyl methacrylate, 23 g of potassium methacrylate and 360 g of deionized water were placed. After removing the air in the flask by introducing $N_2$ gas thereinto for 30 minutes, the temperature of the system was heated to 65° C. with stirring using a water bath. Then, 0.06 g of potassium persulfate was added thereto. The polymerization was carried out at that temperature for 5 hours, and at 90° C. for 2 hours while continuing the stirring to give a jelly-like water-soluble polymer (A).

EXAMPLE 1

Methyl methacrylate in an amount of 800 g, 200 g of N-o-chlorophenylmaleimide, 0.4 g of lauroyl peroxide and 0.2 g of n-octylmercaptane were dissolved to give a monomer solution.

In a 5-liter separable flask equipped with a stirrer and a condenser, 0.1 g of the jelly-like water-soluble polymer (A) as a suspending agent and 2500 g of deionized water were placed, followed by addition of a buffering agent of a combination of disodium hydrogen phosphate-sodium dihydrogen phosphate with stirring to adjust the pH of the resulting suspension medium 7.2. Then, the monomer solution was added to the suspension medium with stirring. The polymerization was carried out at 65° C. for 4 hours at a stirring rate of 240 r.p.m. under a nitrogen atmosphere, followed by polymerization at 98° C. for 2 hours (conversion 99%, gravimetric method). In order to maintain the pH at 7.2 during the polymerization, the buffering agent was added properly.

The thus obtained polymer particles were washed with water, dehydrated and dried. Then, the polymer particles were subjected to injection molding using an injection machine (IS-50 EP, mfd. by Toshiba Machine Co., Ltd.) under conditions of a cylinder temperature of 260° C., an injection speed of 50 $cm^3$/sec., and a mold temperature of 90° C.

The resulting injection molded article was subjected to measurements of the light beam transmittance, heat deformation temperature, remaining monomer amount as follows:

Light beam transmittance: ASTM D1003
Heat deformation temperature: ASTM D648
Remaining monomer amount: gas chromatography
Column: SE-52 (mfd. by Gaskuro Kogyo Co., Ltd.; inner standard, diallyl phthalate) in length of 2 m.

The results are shown in Table 1.

EXAMPLES 2 and 3

The process of Example 1 was repeated except for changing the kind of maleimide and the amount thereof as shown in Table 1.

COMPARATIVE EXAMPLES 1 and 2

The process of Example 1 was repeated except for using methyl methacrylate alone, or changing the mixing amounts of methyl methacrylate and N-cyclohexylmaleimide as shown in Table 1.

Injection molded articles were produced and tested in the same manner as described in Example 1.

The results are shown in Table 1.

EXAMPLES 4 to 8, COMPARATIVE EXAMPLES 3 and 4

The process of Example 1 was repeated except for changing the pH as shown in Table 2.

Injection molded articles were produced and tested in the same manner as described in Example 1.

The results are shown in Table 2.

TABLE 1

|  | Example 1 | Example 2 | Example 3 | Comparative Example 1 | Comparative Example 2 |
|---|---|---|---|---|---|
| Composition (g) | MMA 800 N-Chlorophenyl-maleimide 200 | MMA 800 N-Cyclohexyl-maleimide 100 Styrene 100 | MMA 950 N-t-Butyl-maleimide 50 | MMA 1000 | MMA 600 N-Cyclohexyl-maleimide 400 |
| pH of polymn. system | 7.2 | 6.6 | 6.2 | 6.5 | 6.7 |
| Remaining N-substituted maleimide (%) | 0.62 | 0.48 | 0.18 | 0 | 3.86 |
| Light beam transmittance (%) | 91.0 | 90.2 | 91.3 | 92.2 | 86.4 |
| Heat deformation temperature (°C.) | 107 | 109 | 98 | 95 | 117 |
| Hue | Colorless transparent | Colorless transparent | Colorless transparent | Colorless transparent | Yellow |
| Stability of polymn. system | Stable | Stable | Stable | Stable | Stable |

Note)
MMA: methyl methacrylate
Polymn.: polymerization

TABLE 2

|  | Example 4 | Example 5 | Comparative Example 3 | Comparative Example 4 | Example 6 | Example 7 | Example 8 |
|---|---|---|---|---|---|---|---|
| Composition (g) | MMA 800 N-Chloro-phenyl- | MMA 800 N-Chloro-phenyl- | MMA 800 N-Chloro-phenyl- | MMA 800 N-Chloro-phenyl- | MMA 700 EMI 100 Cyclohexyl | MMA 800 EMI 50 Norbornyl meth- | MMA 600 EMI 100 TCDMA 300 |

TABLE 2-continued

|  | Example 4 | Example 5 | Comparative Example 3 | Comparative Example 4 | Example 6 | Example 7 | Example 8 |
|---|---|---|---|---|---|---|---|
|  | maleimide 200 | maleimide 200 | maleimide 200 | maleimide 200 | methacrylate 200 | acrylate 150 |  |
| pH of polymn. system | 6.9 | 6.4 | 5.0 | 8.2 | 6.9 | 7.1 | 6.8 |
| Remaining N-chlorophenyl-maleimide (%) | 0.59 | 0.63 | 0.49 | 0.53 | 0.38* | 0.15* | 0.41* |
| Light beam transmittance (%) | 91.2 | 90.6 | 88.7 | 89.6 | 90.8 | 91.2 | 90.6 |
| Heat deformation temperature (°C.) | 111 | 110 | 108 | 103 | 103 | 110 | 112 |
| Hue | Colorless transparent | Colorless transparent | Yellow | Pale yellow | Colorless transparent | Colorless transparent | Colorless transparent |
| Stability of polymn. system | Stable | Stable | Unstable | Unstable | Stable | Stable | Stable |

Note)
MMA: methyl methacrylate
Polymn.: polymerization
EMI: N-ethylmaleimide
TCDMA: tricyclo[5, 2, 1, 0$^{2.6}$]deca-8-yl methacrylate
*remaining EMI As mentioned above, the optical resin of the present invention has excellent heat resistance and transparency.

The optical resin of the present invention can be used in the fields of automobile parts, electric parts, optical parts, etc. Particularly, the optical resin of the present application is very suitable for use in optical parts which require heat resistance and transparency, for example, lenses, e.g. lenses for laser pick-up, lenses for glasses, lenses for cameras, lenses for projection television; optical disc substrates, etc.

What is claimed is:

1. A process for producing an optical resin which comprises subjecting a monomer mixture comprising
   (a) 97 to 50% by weight of methyl methacrylate,
   (b) 3 to 30% by weight of an N-substituted maleimide, and
   (c) 0 to 40% by weight of an unsaturated monomer other than methyl methacrylate and the N-substituted maleimide and copolymerizable therewith, a total weight of monomers being 100% by weight, to suspension polymerization in the presence of poly(meth)acrylic acid salt as a suspending agent while maintaining a pH of 5.5 to 7.5 by adding a buffering agent thereto.

2. A process according to claim 1, wherein the pH is maintained at 6.0 to 7.0.

3. A process according to claim 1, wherein the monomer (c) is selected from the group consisting of cyclohexyl methacrylate, norbornyl methacrylate and tricyclo[5,2,1,0$^{2.6}$]deca-8-yl methacrylate.

4. A process according to claim 1, wherein the suspension polymerization is at a temperature of from 0° to 200° C.

* * * * *